United States Patent [19]
Roux

[11] Patent Number: 5,661,767
[45] Date of Patent: Aug. 26, 1997

[54] METHOD FOR REPLACING A THROUGH-TUBE OF THE VESSEL BOTTOM HEAD OF A NUCLEAR REACTOR COOLED BY PRESSURIZED WATER

[75] Inventor: Philippe Roux, Saint Cyr Au Mont d'Or, France

[73] Assignee: Framatome, Courbevoie, France

[21] Appl. No.: 497,478

[22] Filed: Jul. 3, 1995

[30]   Foreign Application Priority Data

Jul. 7, 1994 [FR] France ................... 94 08426

[51] Int. Cl.$^6$ .................................................. G21C 13/036
[52] U.S. Cl. ........................ 376/260; 376/254; 376/250; 29/402.08
[58] Field of Search ................................ 376/260, 307, 376/254, 204, 250, 249; 29/402.08, 890.031; 228/119

[56]               References Cited

U.S. PATENT DOCUMENTS

| | | | |
|---|---|---|---|
| 5,267,279 | 11/1993 | Saito et al. | 376/260 |
| 5,272,734 | 12/1993 | Clark et al. | 376/260 |
| 5,367,768 | 11/1994 | Weems | 376/260 |
| 5,404,382 | 4/1995 | Russ et al. | 376/260 |

FOREIGN PATENT DOCUMENTS

| | | |
|---|---|---|
| 019 908 | 12/1980 | European Pat. Off. . |
| 565 380 | 10/1993 | European Pat. Off. . |
| 595 143 | 5/1994 | European Pat. Off. . |

OTHER PUBLICATIONS

Abstracts of Japan, JP-A-2 098 696 Hitachi, Apr. 1990.

*Primary Examiner*—Daniel D. Wasil
*Attorney, Agent, or Firm*—Pollock, Vande Sande & Priddy

[57]               ABSTRACT

The tube to be replaced is extracted and an internal surface of the bottom head (1b) is then machined around the through opening (10), a hollow shell (20) is attached and fixed on the machined surface (15) of the bottom head (1b), around the through opening (10), by welding along a peripheral edge (19), the hollow shell is bored in order to produce a passage hole (24) through its wall, in extension of the through opening (10) and a welding bevel (23). A replacement through-tube (18) is fixed on the wall of the hollow shell (20) by depositing a welding metal (25) in the bevel (23). The invention applies in particular to the replacement of vessel bottom head penetrations of a pressurized water nuclear reactor.

16 Claims, 4 Drawing Sheets

METHOD FOR REPLACING A THROUGH-TUBE OF THE VESSEL BOTTOM HEAD OF A NUCLEAR REACTOR COOLED BY PRESSURIZED WATER

FIELD OF THE INVENTION

The invention relates to a method for replacing a tube fixed in a through opening of a domed vessel bottom head of a nuclear reactor cooled by pressurized water.

BACKGROUND OF THE INVENTION

Pressurized water nuclear reactors include a vessel containing the core of the reactor which is submerged in the pressurized water for cooling the reactor.

The generally cylindrical vessel of the reactor has a domed bottom head of generally hemispherical shape and a head which is also of hemispherical shape for closing the upper part of the vessel.

The domed bottom head of the vessel is pierced with openings which are parallel to the axis of the vessel, and in each of which an axially directed tubular part for passing through the vessel bottom head is fixed by welding.

These tubular through parts or penetrations of the vessel bottom head have an end projecting below the domed bottom head of the vessel, which is connected to a measuring pipe allowing the vessel bottom head to be joined to an instrumentation room arranged in the structure of the building of the reactor. The vessel bottom head penetrations also have a part projecting above the domed bottom head, inside the vessel, which is intended to engage, with clearance, inside a channel for guiding the lower internals of the reactor which are mounted inside the vessel and which hold the core assemblies.

Each of the guide assemblies, consisting of a measuring pipe, a vessel bottom head penetration, of tubular shape, and the corresponding channel for guiding the lower internals, provides passage for a thimble into which a probe can be introduced, making it possible to carry out measurements inside the core, such as neutron flux measurements or temperature measurements, during operation of the reactor.

In order to increase the reliability and safety operation of nuclear reactors and in order to extend the lifetime of these reactors, the operators need to carry out an increasing number of examinations of the various elements constituting the nuclear reactor. When damage or defects such as cracks are detected on an element of the nuclear reactor, the defective element may possibly be repaired, deactivated or replaced, depending on the seriousness of the defect.

In particular, the condition of the through penetrations of the vessel bottom head is periodically examined, in order to check their integrity after a certain running time of the reactor, especially in the region where the vessel bottom head penetrations are welded onto the vessel bottom head.

The vessel bottom head penetrations are generally made of a nickel alloy, so that, in order to fasten them by welding on the vessel bottom head, it is necessary to deposit a layer of nickel alloy in the bottom of a bevel around the through opening of the vessel bottom head, in order to link the welding metal with the vessel bottom head. The welding metal consisting of a nickel alloy is deposited in the bevel, around the vessel bottom head penetration.

Depositing the welding metal in contact with the vessel bottom head penetration produces heating of this penetration, which heating may be relatively significant.

When the vessel bottom head penetration is made in certain grades of nickel alloy, there may be a risk of the vessel bottom head penetrations cracking in the welding region, after a certain time of use of the nuclear reactor.

In the event that a defect is detected on the internal surface, on the external surface or on the weld of a vessel bottom head penetration, the seriousness and the depth of this defect is evaluated and the defect may possibly be repaired, for example by boring the metal of the penetration to a certain depth in the cracked region, which may be followed by protection of the excavated region by depositing a repair metal or fitting a sleeve.

In certain cases, it is preferable to replace the vessel bottom head penetration completely rather than repairing it.

In the event of such a replacement, it is possible to guarantee perfect integrity of the replacement part and, to replace the defective nickel alloy part, which is susceptible to cracking, with a part made of improved alloy which exhibits little or no susceptibility to cracking corrosion, inside the nuclear reactor.

Various methods have been proposed and envisaged for replacing a vessel bottom head penetration of a nuclear reactor, consisting in disconnecting the weld between the defective penetration and the vessel bottom head, by machining, in extracting the defective vessel bottom head penetration from the through opening of the vessel bottom head and in fixing a vessel bottom head penetration into the through opening by welding.

All the prior art methods have draw-backs, because of the difficulty of implementing the operations of welding the replacement part, and of inspecting the welds carried out and the interactions between the weld and the replacement part, during welding and during cooling of the welding metal.

SUMMARY OF THE INVENTION

The object of the invention is to provide a method for replacing a tube fixed in a through opening of a wall of domed shape and in particular of the bottom head of the vessel of a nuclear reactor cooled by pressurized water, consisting in disconnecting the tube to be replaced from the vessel bottom head, in extracting the tube to be replaced from the through opening of the vessel bottom head and in fixing a replacement tube in the opening, this method making it possible to weld the replacement tube in a simple manner and with perfect working quality, whatever its position on the domed vessel bottom head, to examine the welds carried out and to obtain very high quality fixing of the replacement tube.

For this purpose, after extracting the tube to be replaced, a hollow shell is produced, attached and fixed on the vessel bottom head around the through opening, which hollow shell has a domed outer surface and a concave inner surface, having substantially the shape of spherical caps, by welding the peripheral edge of the hollow shell on the vessel bottom head, so that the concave surface of the hollow shell points towards the internal surface of the vessel bottom head, a wall of the hollow shell is bored to produce a passage hole through the wall of the shell, in extension of the through opening of the vessel bottom head, and a welding bevel in the domed part of the wall of the shell around the passage hole, a replacement through-tube is introduced into the passage hole of the hollow shell and into the through opening of the vessel bottom head and the through-tube is fixed onto the hollow shell by depositing a welding metal in the bevel of the hollow shell.

BRIEF DESCRIPTION OF THE DRAWINGS

In order better to explain the invention, a description will now be given, by way of example, with reference to the attached drawings, of an embodiment of a method for replacing a vessel bottom head penetration of a pressurized water nuclear reactor.

DESCRIPTION OF PREFERRED EMBODIMENT

Figure 1:
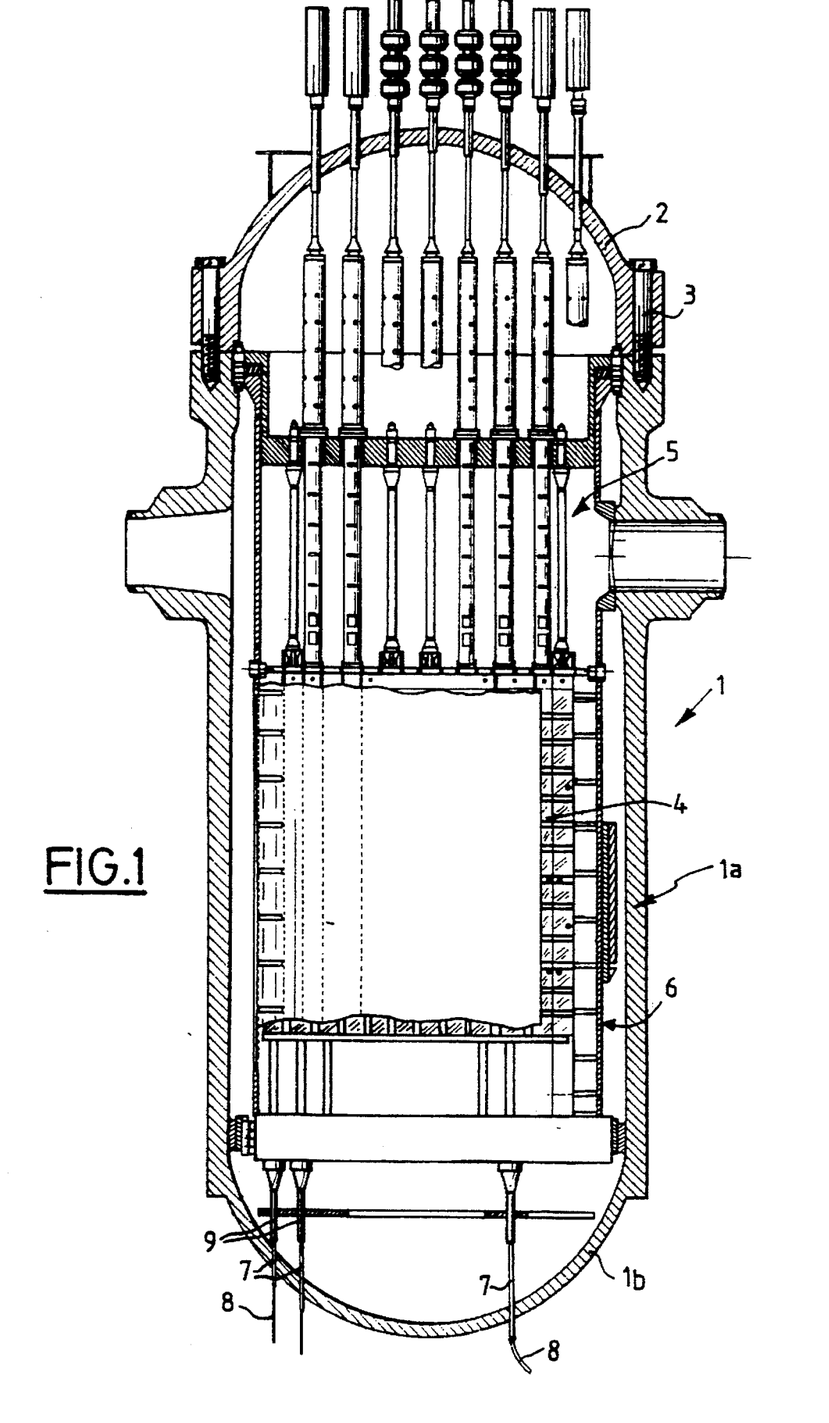
FIG. 1 is a view in section through a vertical plane of the vessel of a pressurized water nuclear reactor.

FIG. 1 shows the vessels 1 of a nuclear reactor.

The vessel includes a substantially cylindrical outer casing 1a which is closed at its lower end by a substantially hemispherical domed bottom head 1b.

The upper end of the casing 1a of the vessel 1 may be closed by a substantially hemispherical head 2 which rests on a bearing support zone at the upper part of the casing 1a of the vessel.

The vessel 1 contains the upper internals 5 and the lower internals 6 which can be dismounted and removed from the vessel of the nuclear reactor, in order to carry out certain maintenance and repair operations.

The core 4 of the nuclear reactor, consisting of juxtaposed fuel assemblies, rests on a part of the lower internals 6 which include means for lateral holding of the fuel assemblies of the core 4.

The upper internals 5 are arranged above the fuel assemblies of the core 4.

The domed bottom head 1b of the vessel is passed through in a direction parallel to the axis of the vessel by tubular parts 7 called vessel bottom head penetrations which are each fixed inside an axially directed opening passing through the vessel bottom head 1b.

The vessel bottom head penetrations 7 have a lower end projecting below the vessel bottom head 1b, which is connected to a measuring pipe 8 allowing the vessel bottom head to be connected to an instrumentation room of the nuclear reactor. The vessel bottom head penetrations also have an upper end part which projects above the concave upper surface of the vessel bottom head 1b which is arranged so as to engage in a vertical guide pipe 9 for the lower internals, when the internals are fitted inside the vessel.

The vessel bottom head penetration 7 and the pipes 8 and 9 allow a thimble to be passed into the vessel 1, which thimble contains a mobile measuring probe, so that the thimble can penetrate into the instrumentation guide tube of a fuel assembly of the core 4.

Figure 2:
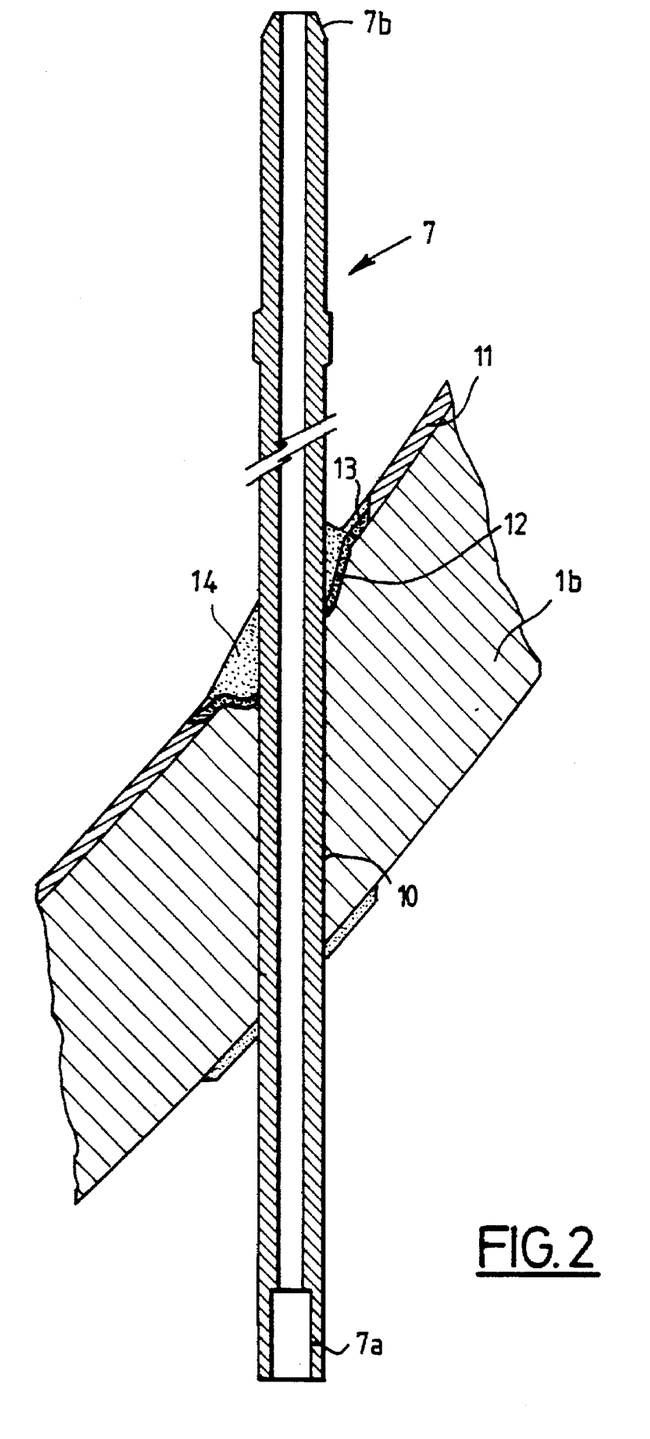
FIG. 2 is a view in section, on a larger scale, of a penetration of the vessel bottom head represented in FIG. 1, fixed on the vessel bottom head by a method according to the prior art.

As shown by FIG. 2, the vessel bottom head 1b is pierced with through openings 10 in the axial direction of the vessel, allowing a vessel bottom head penetration 7 consisting of a tubular part to be passed through and fixed.

The vessel bottom head 1b is made of a weakly alloyed high-strength steel. The internal surface of the bottom head 1b which is intended to come into contact with the pressurized water filling the vessel of the nuclear reactor during operation of the reactor is lined with a layer 11 of stainless steel having a thickness of the order of 7 or 7.5 mm.

At each of the through openings of the vessel bottom head, such as the opening 10, the internal surface of the vessel bottom head is machined to form a bevel 12 passing through the stainless steel lining 11 and penetrating into the metal of the domed bottom head 1b made of weakly alloyed steel, in order to allow welding of the vessel bottom head penetration 7 engaged in the opening 10 on the vessel bottom head 1b.

The bottom of the bevel 12 is lined with a lining layer 13, called a "buttering layer", made of a nickel alloy with a grade identical or similar to the grade of the nickel alloy from which the tubular vessel bottom head penetration 7 is made.

The vessel bottom head penetration 7 is welded on the vessel bottom head 1b by depositing a welding metal consisting of a nickel alloy having a composition similar or close to the composition of the nickel alloy of the vessel bottom head penetration 7, inside the bevel 12 which is lined with the buttering layer 13.

The welding metal 14 is deposited in successive layers in the bevel 12.

The vessel bottom head penetration 7 has a lower end part projecting below the domed bottom head 1b, the end 7a of which allows connection to a measuring pipe.

The vessel bottom head penetration 7 has an upper end part terminating in a bevel 7b arranged above the vessel bottom head 1b and intended to engage inside a pipe for guiding the lower internals of the nuclear reactor which are fitted inside the vessel 1.

When a defect such as a crack is detected in the wall of a vessel bottom head penetration as represented in FIG. 2, during examination of the vessel of a nuclear reactor, after discharging the core and dismounting the internals, it may be necessary to replace the vessel bottom head penetration if the detected defect is of a certain degree of seriousness.

This is so, for example, in the case of a crack passing through the wall of the penetration, for example in the region of the weld 14 onto the vessel bottom head 1b.

In this case, the elements for protecting the vessel bottom head are dismounted in proximity to the penetration and the penetration is separated from the corresponding measuring pipe, so as to allow access to the internal bore of the penetration, into which bore a narrow machining tool can be introduced. It is also possible to gain access to the bore of the penetration from inside the vessel.

The wall of the penetration 7 and the metal of the weld 14 are machined from inside, so as to make it possible to extract the defective vessel bottom head penetration via the top of the domed bottom head from inside the vessel and via the bottom of the vessel.

The internal surface of the vessel bottom head is then inspected around the opening 10 into which the penetration 7 had been fixed, in order to determine the position on the vessel bottom head of the dividing line between the metal of the weld 14, consisting of a nickel alloy, and the stainless steel lining layer 11 of the vessel bottom head.

The position of the dividing line is located with respect to the region intended for welding the shell for fastening the replacement penetration. If the dividing line interferes with the welding region, a nickel alloy which is insensitive to stress corrosion in the primary environment is used for producing the weld. On the other hand, if there is no interference, stainless steel will be used as the welding metal. The inspection of the surface of the vessel bottom head in proximity to the penetration to be replaced therefore makes it possible to define the welding metal.

Depending on the results of the determination of the dividing line between the nickel alloy and the stainless steel, the internal surface of the vessel bottom head 1b is machined around the through opening 10 of the domed bottom head.

Figure 3:
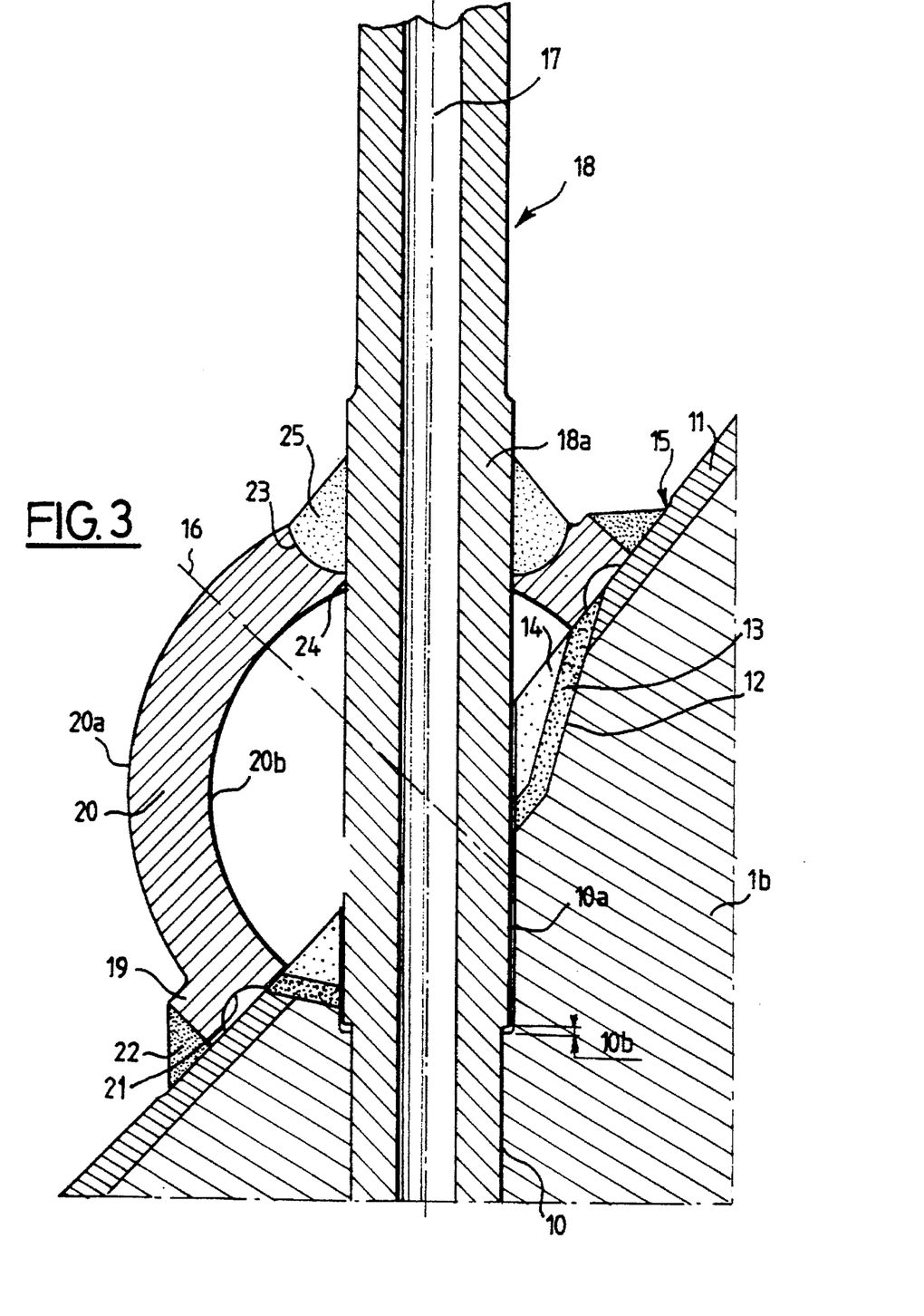
FIG. 3 is a partial view in section of a replacement vessel bottom head penetration fixed on the vessel bottom head of a pressurized water nuclear reactor by the method according to the invention.

FIG. 3 shows the substantially circular region 15 of the bottom head 1b in which remachining has been carried out.

The region 15 is machined by a tool which is positioned with respect to the coordinate system of the vessel and has a machining axis coinciding with the axis 16 normal to the domed vessel bottom head, intersecting with the axis 17 of the through opening 10 of the vessel bottom head at a point located substantially on the internal surface of the domed bottom head 1b, at the centre of the opening 10.

Machining with a cutting tool mounted rotationally about the axis 16 makes it possible to machine a region having a circular contour surrounding the opening 10, so as to remove a fine layer of covering material of the vessel bottom head.

The weld 14 and the nickel alloy buttering layer 13 occupy an elongate region of substantially elliptical shape on the internal surface of the vessel bottom head. The region 15 in which the internal surface of the bottom head 1b is machined has a circular shape and a radius larger than the minor axis of the elliptical region.

The internal surface of the vessel bottom head must be machined in a perfectly controlled manner, so that a layer of stainless steel 11 is left on the vessel bottom head at the region 15, with a sufficient thickness for fixing the replacement vessel bottom head penetration, by means of a hollow shell mounted on the vessel bottom head, without thermally deteriorating the bottom head metal located under the lining. In the case of an excessively thin residual lining layer, heating of the bottom head metal during the welding leads to weakening of the bottom head.

It is therefore necessary for the stainless steel lining layer 11 in the region 15 to be at least equal to 5 mm thick.

Because the nominal thickness of the stainless steel layer 11 is substantially equal to 7 mm, the depth to which the internal surface of the vessel bottom head is machined in the region 15 must remain less than 2 mm.

It is therefore necessary to control the conditions for remachining the internal surface of the vessel bottom head perfectly. This presents difficulties, especially because of the curvature of the vessel bottom head.

In order to keep a sufficient thickness of metal at all points, in spite of the curvature of the vessel bottom head, it is possible to machine the lining in several mutually inclined planes, instead of in a single plane.

If the residual thickness is too small to carry out machining, a sufficient overthickness may be added by welding, using an automatic machine or by manual deposition, around the axis 16, in order to allow subsequent machining.

The hollow shell 20 by which the replacement vessel bottom head penetration 18 is fixed has a wall defined by an external surface 20a and an internal surface 20b which have the shape of spherical caps.

In fact, in the embodiment represented in FIG. 3, the surfaces 20a and 20b are hemispherical and concentric.

As represented by FIG. 3, when the hollow shell 20 is fixed by welding on the vessel bottom head 1b, the center to the two hemispheres 20a and 20b defining the wall of the shell 20 are substantially coincident with the point of intersection of the axes 16 and 17.

The shells 20 used for fixing the replacement vessel bottom head penetrations 18 are all identical, whatever the position on the vessel bottom head of the vessel bottom head penetration to be replaced. This advantage is due to the spherical-cap shape of the shell, which makes it possible to arrange the spherical cap with its axis along the radius of the domed bottom head in any region of the bottom head 1b.

The spherical shape makes it possible to weld the shell on the vessel bottom head and the penetration on the shell by depositing weld beads along plane and circular paths. The welding of the shell on the vessel bottom head and of the penetration on the shell can be carried out with one set of equipment. In addition, this spherical shape makes it possible to increase the moment of inertia during vibrational stresses of hydraulic origin in the vessel and easily to take up the thermal deformations of the vessel bottom head.

The hollow shell 20 has a bearing and welding root 19 constituting the open peripheral edge of the shell 20, which is machined on its bearing surface in the form of a groove 21 in the shape of a torus portion.

The flexibility of the shell under the hydraulic pressure inside the vessel is thus improved.

The radius of the region 15 machined on the vessel bottom head around the opening 10 is defined so that it is possible to fix the shell 20, inside the region 15, in a center position, while bearing on the vessel bottom head via its root 19 which is fixed inside the region 15 by a weld bead 22. The root 19 overlaps the boundary between the nickel alloy constituting the welding metal 24 and the buttering 13 and the stainless steel lining of the vessel bottom head in four regions, called transition regions.

After machining of the region 15, liquid penetrant examination of this machined region 15 is carried out, so as to check for defects.

If the region 15 has no defects, the hollow shell 20 is fixed by welding.

In the event that the region 15 has a defect, this must be repaired by excavation and refilling before the hollow shell 20 is fixed by welding.

The hollow shell 20 is fitted in a perfectly centered arrangement inside the region 15.

The axis 16 which points along a radius of the vessel bottom head coincides with the axis of symmetry of the spherical caps 20a and 20b defining the wall of the shell 20.

The bearing root 19 in contact with the internal surface of the vessel bottom head 1b is held in place by spot welds.

A welding tool is then mounted and adjusted, which tool includes a support which can rotate about the axis 16, allowing the weld bead 22 to be made axisymmetrically about the axis 16, in successive passes.

It is necessary to use a filler metal consisting of a nickel alloy in order to produce the weld bead 22, since the root 19 of the shell 20 is welded alternately on a nickel alloy region and on a stainless steel region which are separated by the transition regions. A filler metal consisting of a nickel alloy actually makes it possible to weld both two nickel alloy parts together, and a nickel alloy part to a stainless steel part.

After the shell 20 has been welded, the wall of the shell 20 is bored and the through opening 10 of the vessel bottom head 1b is rebored in a region 10a extending over a predetermined length; along the direction of the axis 17, in order to allow a replacement vessel bottom head penetration 18 to be fitted.

The replacement vessel bottom head 18 has end parts substantially identical to the end parts of the vessel bottom head penetration 7 which is being replaced, and a central part 18a which is diametrally widened with respect to the main part of the penetration 18.

For example, in the case of a through opening having a nominal diameter slightly greater than 38 mm, the diameter of the main part of the replacement vessel bottom head penetration 18 is 38 mm and the diameter of the central widened part 18a is 43 mm.

The wall of the hollow shell 20 and the opening 10 are bored and rebored along the direction of the axis 17.

The hollow shell 20 may have a rough-drilled hole, in which case it is possible by using a boring tool set along the axis 17, to rebore the wall of the hollow shell 20 to a diameter slightly greater than 43 mm as well as reboring of the opening 10 to the same diameter, through the weld region 14 and a part of the vessel bottom head 1b, in exact extension of the bore passing through the wall of the hollow shell 20.

The boring of the wall of the shell 20 may be carried out by fitting an expandable centering device in the opening 10, in which it is possible to engage, in a perfectly coaxial position with respect to the opening 10, a centering pin which has one end housed in the rough-drilled hole passing through the wall of the shell 20. It is then possible to engage a boring tool on the end of the centering pin which projects with respect to the surface of the shell, from inside the vessel, which boring tool is mounted rotationally on the centering pin.

The rebored part 10a of the opening 10 passing through the vessel bottom head 1b is intended to receive the lower end of the central part 18a of the replacement vessel bottom head penetration 18.

A bevel 23 is also machined in the wall of the hollow shell 20, around the opening of the wall which has been rebored.

At the end of machining the bevel 23, a bore 24 is left for receiving the part 18a of the replacement vessel bottom head penetration 18 inside the wall of the hollow shell 20, over a length of a few millimeters.

Liquid penetrant examination is carried out of the openings 10a and 24 and of the bevel 23, so as to detect and optionally to repair any defect such as a crack present on the remachined surfaces.

The boring tool and the centering pin can be separated from the expandable centering device and extracted from inside the vessel.

The replacement vessel bottom head penetration 18 is fitted inside the bores 24 and 10a so as to keep a clearance 10b of a few millimeters between the lower end of the central part 18a of the replacement vessel bottom head penetration and the shoulder separating the bottom of the rebored opening 10a from the main part of the opening 10.

The replacement vessel bottom head penetration 18 is then fixed by depositing a welding metal 25 in the bevel 23 of the wall of the hollow shell 20, around the penetration 18.

In order to deposit the welding metal 25 for fastening the vessel bottom head penetration 18 in the bevel 23, it is possible to use the welding device which was previously used for making the bead 22 for welding the hollow shell 20 onto the vessel bottom head 1b.

The welding tool is then rotationally mounted about an axis coinciding with the axis 17 of the penetration and adjusted so as to deposit the weld 25 in the bevel 23, around the penetration 18.

The welds of the shell and of the penetration are examined.

The local protection of the vessel bottom head can then be refitted around the replacement penetration 18 and the measuring pipe can be fixed to the end of the penetration 18 which projects below the vessel bottom head.

The leaktight fixing of the replacement vessel bottom head penetration 18 on the vessel bottom head is produced by the weld 25. The part 18a of the penetration 18 has a flat in its part which is engaged inside the part 10a of the through opening, and the lower main part of the penetration 18 also has a flat in its part which is engaged inside the through opening 10.

Measuring wires connected to at least one detector located in the internal volume of the hollow shell 20 can be passed inside the clearance formed between the flat and the bore of the vessel bottom head, along the vessel bottom head penetration 18 and the opening 10, 10a. It is thus possible to detect moisture in the internal volume of the shell 20, which makes it possible continuously to examine the seal of the weld 22 for fixing the shell 20 on the vessel bottom head and the weld 25 for fixing the replacement penetration 18 on the shell 20, during operation of the reactor.

This seal can also be examined by analyzing air sampled from the internal volume of the shell and analyzed on a radionuclide or moisture detector. In this case, the penetration will be equipped with a pipeline which will allow the air to be sampled.

It should be noted that, whatever the position on the vessel bottom head of the vessel bottom head penetration to be replaced, the replacement vessel bottom head penetration can be fixed by using a hollow shell having standard shape and dimensions.

In fact, the hollow shell 20 whose wall is defined by surfaces in the shape of spherical caps can always be placed so that its axis points along the radius of the vessel bottom head passing through the center of the through opening, after the lining of the vessel bottom head has been machined.

In order to carry out repairs of any number of vessel bottom head penetrations, it is therefore possible to manufacture and supply any number of fixing shells. This makes it possible to obtain a reduction in the cost of these parts, which can be batch produced.

The fixing shells can be drilled and bored after the hollow shell has been welded on the vessel bottom head, under very good precision conditions, by aligning the drilling and/or boring axis on the axis of the through opening of the vessel bottom head.

In addition, the operations of welding the hollow shell on the vessel bottom head and the replacement penetration on the shell can be carried out with the same welding device fixed on the welding bottom head.

Because of the presence, in the central part of the replacement penetration 18, of a diametrally widened part 18a and the shoulder between the rebated part 10a and the non-rebored part of the opening 10, the vessel bottom head penetration is held perfectly and cannot he ejected, in the event of breaking of the weld 25 on the hollow shell 20.

Figure 4:
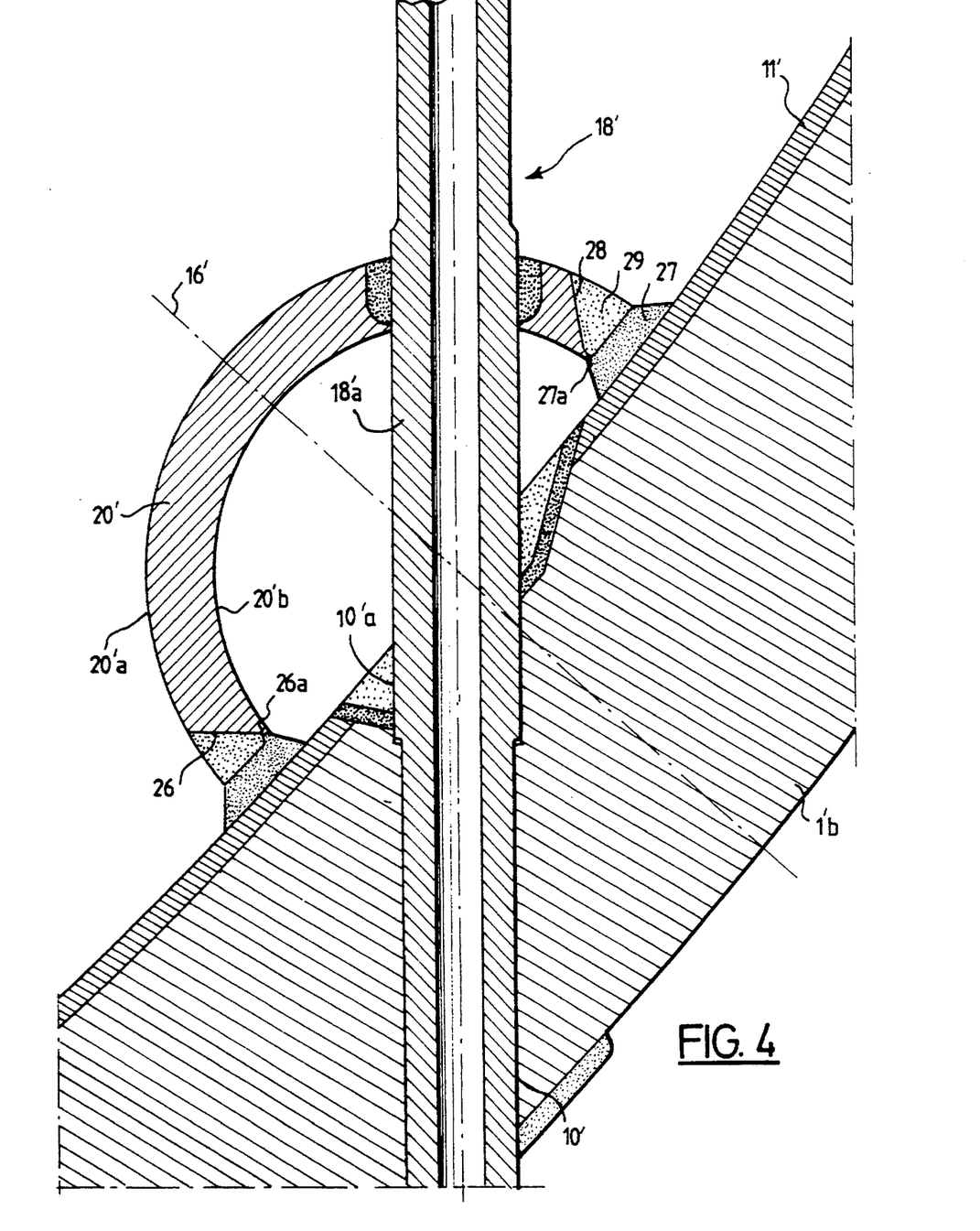
FIG. 4 is a sectional view similar to the view in FIG. 3 and relating to an alternative embodiment of the method according to the invention.

FIG. 4 shows an alternative embodiment of a mode of fixing a penetration on the vessel bottom head of a nuclear reactor. The similar elements in FIGS. 3 and 4 have the same references, but assigned the (prime) in the case of the elements represented in FIG. 4.

The replacement vessel bottom head penetration 18' is fixed on the vessel bottom head 1'b inside the through opening 10' by means of a shell 20' bounded by a domed external surface 20'a and a concave internal surface 20'b which have substantially the shape of hemispheres.

In a first phase of the replacement method, the vessel bottom head penetration to be replaced has been machined and extracted by operations which are completely identical to the corresponding operations described hereinabove with reference to FIGS. 2 and 3.

The alternative embodiment of the replacement method, as represented in FIG. 4, differs from the embodiment described hereinabove in that the hollow shell 20' does not have an assembly rim similar to the rim 19 of the shell 20.

The open end part of the shell 20' is machined to form a bevelled rim 26 and a bearing root 26a over the entire periphery of the bearing edge of the shell.

In order to fasten the shell 20' on the vessel bottom head 1'b, a thick layer of nickel alloy is first deposited in annular form on the lining layer 11' of the vessel bottom head 1'b, around the through opening 10'.

The thick layer deposited is machined to form a bearing and fixing ring 27 which has an inner bearing heel 27a with the same diameter and width as the bearing heel 26a of the shell 20' and having as its axis the radius 16' of the hemispherical bottom head 1'b which passes through the center of the opening 10'.

The shell 20' is fitted on the bearing ring 27, so that the roots 26a and 27a are in superposed positions and so that the axis of the shell 20' coincides with the axis 16'.

A welding bevel 28 is defined by the rim 26 and the upper surface of the ring 27.

A welding metal 29 is deposited in the bevel 28, so as to fix the hollow shell 20' on the vessel bottom head 1'b.

The following operations of boring the wall of the shell 20', of reboring the opening 10 and of fitting and welding the replacement penetration 18' comprising a diametrally widened part 18'a are carried out in manner identical to the corresponding operations described hereinabove and relating to the replacement penetration 18.

This embodiment makes it possible to avoid machining of the lining layer 11' of the vessel bottom head; in addition, the final examination of the quality of production of the junction plane and of the welding of the shell on the ring attached on the vessel bottom head can be carried out under good conditions.

In the case of a replacement vessel bottom head penetration made of nickel alloy, a shell is used which is made of nickel alloy with the same grade as the penetration, and the shell is welded on the vessel bottom head, and the penetration is welded on the shell using a welding metal consisting of a nickel alloy.

The hollow shell 20 may have a shape other than the hemispherical shape which has been described.

It is also possible to implement the method of the invention by using a replacement vessel bottom head penetration made of stainless steel.

In this case, it is possible to use a shell made of nickel alloy or of stainless steel. In the case of a nickel alloy shell, the metal for welding the shell on the vessel bottom head and for welding the penetration on the shell is a nickel alloy.

In the case of a stainless steel shell, the welding metal has the composition of a stainless steel. However, it may be necessary, in this case as well, to use a nickel alloy, as the metal for welding the shell on the vessel bottom head, when a vessel bottom head penetration made of nickel alloy is being replaced, because of the presence of nickel alloy deposited on the vessel bottom head around the through opening, as indicated hereinabove.

In the case of a replacement vessel bottom head penetration (such as 18 or 18') made of stainless steel, the bimetal junction between the vessel bottom head penetration and the measuring pipe, which is made of stainless steel, is advantageously removed. A weld is thus produced made of stainless steel which is insensitive to corrosion, and the drawbacks of the bimetallic welding of the measuring pipe on the vessel bottom head penetration to be replaced are avoided.

The root for fixing the hollow shell on the vessel bottom head may have a form other than the form described and represented.

The replacement method according to the invention can be used for fixing tubular through parts of a wall other than vessel bottom head penetrations of a pressurized water nuclear reactor.

I claim:

1. Method for replacing a tube fixed in a through opening of a bottom head of a vessel of a nuclear reactor cooled by pressurized water, comprising disconnecting the tube to be replaced from the vessel bottom head;

extracting the tube to be replaced from the through opening of the vessel bottom head; and fixing a replacement tube in the opening and, after extraction of the tube to be replaced, (a) attaching and fixing a hollow shell on the bottom head of the vessel, around the through opening, said hollow shell having a domed outer surface and a concave inner surface which have substantially a shape of spherical caps, by welding along a peripheral edge of the shell onto the bottom head, so that the concave surface points toward the internal surface of the bottom head;

(b) boring a wall of the hollow shell in order to produce a passage hole through the wall, in extension of the through opening of the vessel bottom head, and a welding bevel in the domed surface of the wall of the shell, around the passage hole;

(c) introducing a replacement through-tube into the through opening of the vessel bottom head and into the passage hole of the shell;

(d) fixing the replacement through-tube onto the shell by depositing a welding metal in the bevel of the shell.

2. Method according to claim 1, comprising, after extraction of the tube to be replaced, the steps of (a) machining, with removal of chips, of the internal surface of the bottom head of the vessel over a region around the through opening; and (b) attaching and fixing the hollow shell in the machined region of the bottom head of the vessel.

3. Method according to claim 2, wherein the machining of the internal surface of the bottom head is carried out in a lining layer of the vessel bottom head.

4. Method according to claim 1, including the steps of (a) depositing a thick annular layer of metal on the vessel bottom head around the through opening;

(b) machining the thick deposited layer to form a bearing ting for the hollow shell; and (c) fixing the hollow shell, via a peripheral edge, on the machined surface of the ring by depositing a welding metal in a bevel bounded by the peripheral edge and the machined surface of the ring.

5. Method according to claim 4, wherein the peripheral edge of the hollow shell and the machined surface of the bearing ring include respective bearing roots, and the method further comprises placing the bearing roots in contact with each other before fixing the hollow shell on the bearing ring by welding.

6. Method according to claim 1, wherein the replacement through-tube includes a diametrally widened central part, and the method further comprises reboring the through opening of the bottom head over a part of its length, to a diameter at least equal to the diameter of the diametrally widened part of the replacement through-tube, and, during the fitting of the replacement through-tube, engaging a portion of the diametrally widened part of the replacement through-tube in the rebored part of the through opening of the bottom head.

7. Method according to claim 6, comprising fitting the replacement through-tube into the through opening so that an end shoulder separating the widened-diameter part of the replacement tube from a main part of the replacement tube is located at a predetermined distance from the shoulder separating the rebored part from the non-rebored part of the through opening, and depositing the welding metal of the replacement through-tube on the hollow shell.

8. Method according to claim 1, wherein the peripheral edge of the hollow shell has a groove in the form of a torus portion on an annular surface for contact with the internal surface of the vessel bottom head.

9. Method according to claim 1, of replacing a through-tube arranged in any region of a domed bottom head, comprising providing a replacement tube from a batch of identical tubes and attaching and fixing the replacement tube on the vessel bottom head, whatever the position of the through opening on the domed bottom head.

10. Method according to claim 1, comprising using one and the same welding device for welding the hollow shell onto the bottom head and for depositing the welding metal of the replacement through-tube on the hollow shell.

11. Method according to claim 1, comprising using a replacement adaptor which has a flat in a part of said replacement adaptor which is located in the through opening, so that a communication space is formed between the internal volume of the hollow shell and an external region of the domed bottom head.

12. Method according to claim 11, comprising the step of detecting, during operation of the nuclear reactor, after its restarting, a possible presence of water inside a chamber defined by the hollow shell and the internal surface of the vessel bottom head.

13. Method according to claim 1, in the case of a vessel bottom head lined with a layer of stainless steel and a vessel bottom head penetration to be replaced which is made of nickel alloy and fixed on the vessel bottom head by means of a welding metal made of nickel alloy, comprising the step, prior to matching the surface of the vessel bottom head around the opening, after extraction of the vessel bottom head penetration to be replaced, of detecting a boundary between the nickel alloy of the welding metal and the stainless steal of the lining layer.

14. Method according to claim 1, comprising liquid penetrant examination of the surface machined by removing chips around the opening before fastening the hollow shell on the vessel bottom head by welding.

15. Method according to claim 1, comprising liquid penetrant examination of the bore of the hollow shell and of a rebored region of the through opening, prior to fastening of the replacement through-tube by welding.

16. Method according to claim 1, wherein the through-tube to be replaced is a penetration of the bottom head of the vessel of a pressurized water nuclear reactor, made of nickel alloy, and the replacement through-tube is made of stainless steel.

* * * * *

UNITED STATES PATENT AND TRADEMARK OFFICE
CERTIFICATE OF CORRECTION

PATENT NO. : 5,661,767
DATED : August 26, 1997
INVENTOR(S) : Roux

It is certified that error appears in the above-identified patent and that said Letters Patent is hereby corrected as shown below:

ON THE TITLE PAGE:

Item
[73] "Assignee: Framatome" should read --Assignees: Framatome and Electricité de France - Service National--.

Signed and Sealed this

Twelfth Day of May, 1998

Attest:

BRUCE LEHMAN

*Attesting Officer*    *Commissioner of Patents and Trademarks*